(12) United States Patent
Ohtake et al.

(10) Patent No.: US 7,719,569 B2
(45) Date of Patent: May 18, 2010

(54) IMAGE PROCESSING APPARATUS AND IMAGE PROCESSING METHOD

(75) Inventors: Toshifumi Ohtake, Ome (JP);
Yasukazu Okamoto, Akashi (JP);
Tsukasa Ike, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/426,040

(22) Filed: Apr. 17, 2009

(65) Prior Publication Data

US 2009/0295927 A1 Dec. 3, 2009

(30) Foreign Application Priority Data

May 28, 2008 (JP) ............... 2008-139553

(51) Int. Cl.
*H04N 5/225* (2006.01)
*G06K 9/00* (2006.01)
*G06K 9/46* (2006.01)
*G06K 9/66* (2006.01)
*G06K 9/62* (2006.01)

(52) U.S. Cl. ............... 348/170; 382/103; 382/165; 382/190; 382/203; 382/209

(58) Field of Classification Search ............... 348/169, 348/170, 208.14; 382/103, 165, 190, 195, 382/203, 209, 219, 220, 224, 282
See application file for complete search history.

(56) References Cited

U.S. PATENT DOCUMENTS 6,128,003 A * 10/2000 Smith et al. ............... 345/157
6,750,848 B1 * 6/2004 Pryor ............... 345/168
6,788,809 B1 * 9/2004 Grzeszczuk et al. ......... 382/154

(Continued)

FOREIGN PATENT DOCUMENTS

JP 2000105819 A * 4/2000

(Continued)

OTHER PUBLICATIONS

Notification of Reasons for Rejection issued by JPO in the corresponding to the Japanese Patent Application No. 2008-139553 mailed on Jun. 16, 2009.

(Continued)

*Primary Examiner*—John M Villecco
(74) *Attorney, Agent, or Firm*—Knobbe, Martens, Olson & Bear LLP (57) ABSTRACT

According to one embodiment, an image processing apparatus includes an image-capturing module configured to captures an image, a module configured to detect a first object region from the image, a module configured to extract color information of an image of the first object region, a module configured to detect candidates of a second object region, which is an object of recognition, from the image, a module configured to extract color information of an image of the second object region, and sets reference color data, a module configured to select the candidates of the second object region on the basis of the reference color data and the color information of the image of the first object region with respect to each of the candidates of the second object region, and a module configured to output, as an object of recognition, any one of the candidates of the second object region.

12 Claims, 6 Drawing Sheets

U.S. PATENT DOCUMENTS

| | | | |
|---|---|---|---|
| 7,522,769 B2 * | 4/2009 | Harville et al. | 382/167 |
| 7,574,016 B2 * | 8/2009 | Steinberg et al. | 382/103 |
| 2002/0186200 A1 * | 12/2002 | Green | 345/156 |
| 2006/0209021 A1 * | 9/2006 | Yoo et al. | 345/156 |
| 2006/0284837 A1 * | 12/2006 | Stenger et al. | 345/156 |
| 2007/0031032 A1 * | 2/2007 | Oh et al. | 382/167 |
| 2007/0092134 A1 * | 4/2007 | Fukui et al. | 382/160 |
| 2007/0195997 A1 * | 8/2007 | Paul et al. | 382/104 |
| 2008/0292151 A1 * | 11/2008 | Kurtz et al. | 382/128 |
| 2009/0103780 A1 * | 4/2009 | Nishihara et al. | 382/103 |
| 2009/0153655 A1 * | 6/2009 | Ike et al. | 348/77 |
| 2009/0262981 A1 * | 10/2009 | Ike et al. | 382/103 |

FOREIGN PATENT DOCUMENTS

| | | |
|---|---|---|
| JP | 2001-056861 | 2/2001 |
| JP | 2001-209796 | 8/2001 |
| JP | 2004-265222 | 9/2004 |
| JP | 2004-272515 | 9/2004 |
| JP | 2005-078257 | 3/2005 |
| JP | 3775782 | 5/2006 |
| JP | 2006-350577 | 12/2006 |
| JP | 2006-350578 | 12/2006 |
| JP | 2007-087089 | 4/2007 |
| JP | 2007-122218 | 5/2007 |
| JP | 2007-148663 | 6/2007 |
| JP | 2008173318 A * | 7/2008 |
| WO | WO 2007/037065 A1 | 4/2007 |

OTHER PUBLICATIONS

Explanation of Non-English Language References.

* cited by examiner

IMAGE PROCESSING APPARATUS AND IMAGE PROCESSING METHOD

CROSS-REFERENCE TO RELATED APPLICATIONS

This application is based upon and claims the benefit of priority from Japanese Patent Application No. 2008-139553, filed May 28, 2008, the entire contents of which are incorporated herein by reference.

BACKGROUND

1. Field

One embodiment of the present invention relates to an image processing apparatus and an image processing method, which recognize an object in an image.

2. Description of the Related Art

Conventionally, there has been proposed an image processing apparatus which recognizes a specific object from an image which is captured by a camera. Jpn. Pat. Appln. KOKAI Publication No. 2007-87089, for instance, discloses a gesture recognition apparatus which recognizes, from an input image, a gesture by the hand.

This gesture recognition apparatus executes a process of detecting a region of the hand from an input color image, and finding the position of the hand. As regards the initially input image, a flesh color likelihood map is prepared by using a flesh color model which is prestored in a flesh color model database, and a plurality of candidate regions of the region of the hand of a predetermined size are set at random positions of the flesh color likelihood map. A candidate region, where a mean value of the flesh color likelihood value is a predetermined value or more, is recognized as the region of the hand, and the position of the hand is found from the hand region with a weighted mean value of the flesh color likelihood value of pixels in the region of the hand. Further, a color histogram of pixels of the region of the hand is prepared and stored as a reference value histogram. As regards a frame image which is input after the frame image from which the position of the hand has first been found, candidate regions of the hand of a predetermined size are randomly set in the input image, and the degree of similarity between the color histogram, which has been found with respect to each candidate region, and the reference color histogram is examined. Then, a process is executed to find the position of the hand by using the candidate region with a high degree of similarity as the region of the hand.

As described above, in the gesture recognition apparatus disclosed in KOKAI Publication No. 2007-87089, with respect to the first input frame image, the position of the hand is found on the basis of color information (flesh color likelihood value) and is stored as the reference color histogram. As regards a frame image which is input after the first frame image, candidate regions of the hand of a predetermined size are set, and the degree of similarity between the color histogram, which has been found with respect to each candidate region, and the reference color histogram is examined. Then, the candidate region with a high degree of similarity is found as the region of the hand.

Specifically, in the conventional gesture recognition apparatus, the position of the hand for preparing the reference color histogram is found on the basis of the color information (flesh color likelihood value). Normally, the color of a color image varies depending on the photographing environment (e.g. the condition of the camera operation, the kind of illumination, and a change in position of the light source), even when the same object (e.g. the hand) is photographed. Thus, there is a concern that the position of the hand for preparing the reference color histogram cannot surely be found due to the variation in color.

On the other hand, if the position of the hand is to be detected without using the color information, there is a case in which a plurality of patterns similar to the shape of the hand are present in the image, and it is difficult to detect only the hand that is the object of recognition.

In addition, in the conventional gesture recognition apparatus, the degree of similarity between the reference color histogram, which is based on the first input frame image, and the color histogram, which is found from a subsequent frame image, is examined. Thus, if the photographing environment at the time of photographing the first frame image varies, the color histogram, which is found from the subsequent frame image, also varies and it becomes difficult to correctly examine the similarity.

Moreover, since the position of the "hand" is found by using the flesh color model that is stored in the flesh color model database, that is, the absolute color information, it would be difficult to precisely recognize the "hand" unless the flesh color model database (color information) is prepared in consideration of individual differences between various persons, e.g. persons with the black skin or persons with the white skin.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an image processing apparatus comprising: an image-capturing module which captures an image; a first object region detection module which detects a first object region from the image that is captured by the image-capturing module; a first color information extraction module which extracts color information of an image of the first object region; a second object region detection module which detects candidates of a second object region, which is an object of recognition, from the image that is captured by the image-capturing module; a second color information extraction module which extracts color information of an image of the second object region, and sets reference color data; a select module which compares the reference color data, which is set by the second color information extraction module, and the color information, which is extracted by the first color information extraction module, with respect to each of the candidates of the second object region, which are detected by the second object region detection module, and selects the candidates of the second object region on the basis of a comparison result; and an output module which outputs, as an object of recognition, any one of the candidates of the second object region, which are selected by the selection module.

An embodiment of the present invention will now be described with reference to the accompanying drawings.

Figure 1:
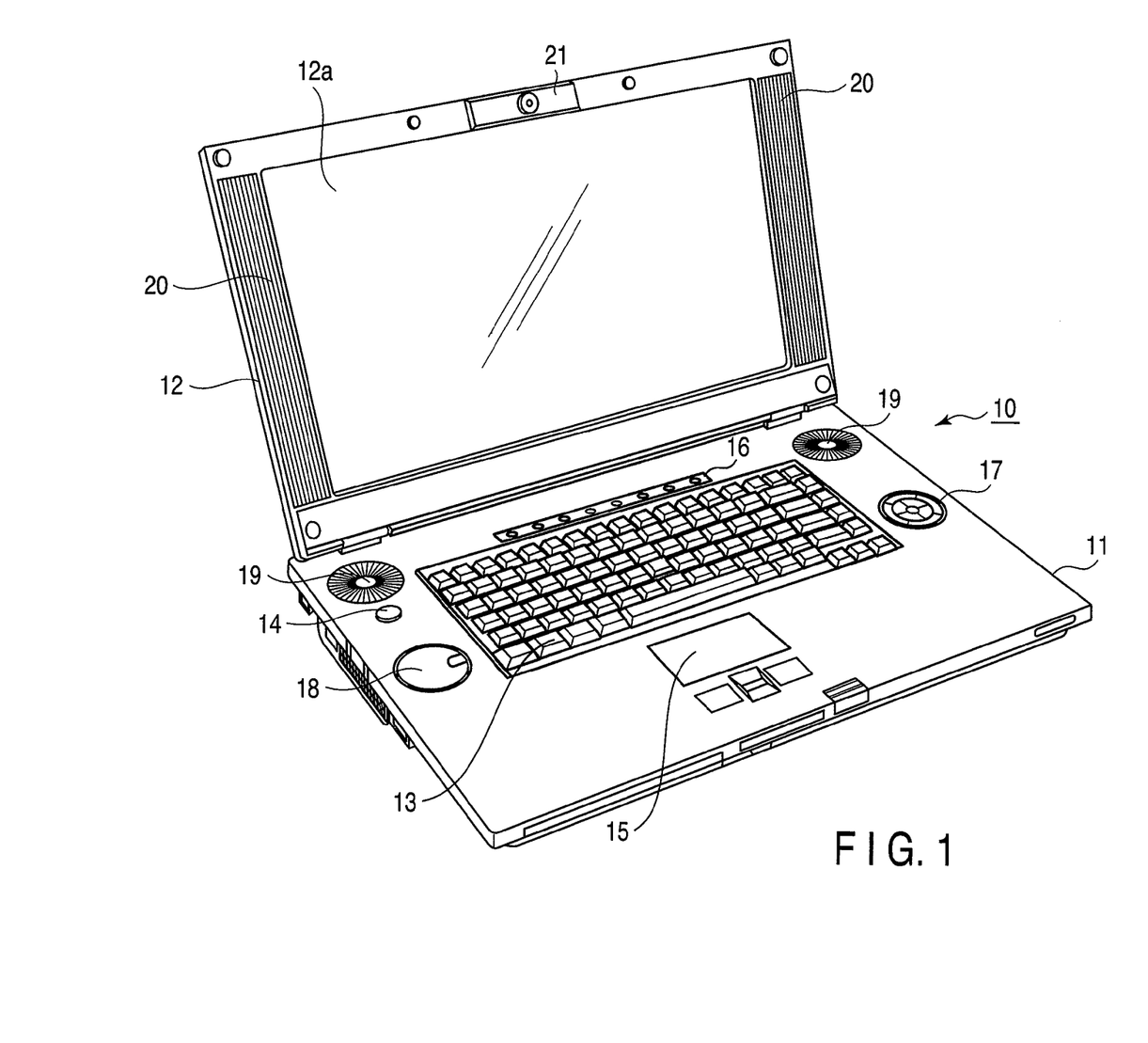
FIG. 1 is an exemplary perspective view showing the state in which a display unit of a personal computer (image processing apparatus) according to an embodiment of the invention is opened.
Figure 2:
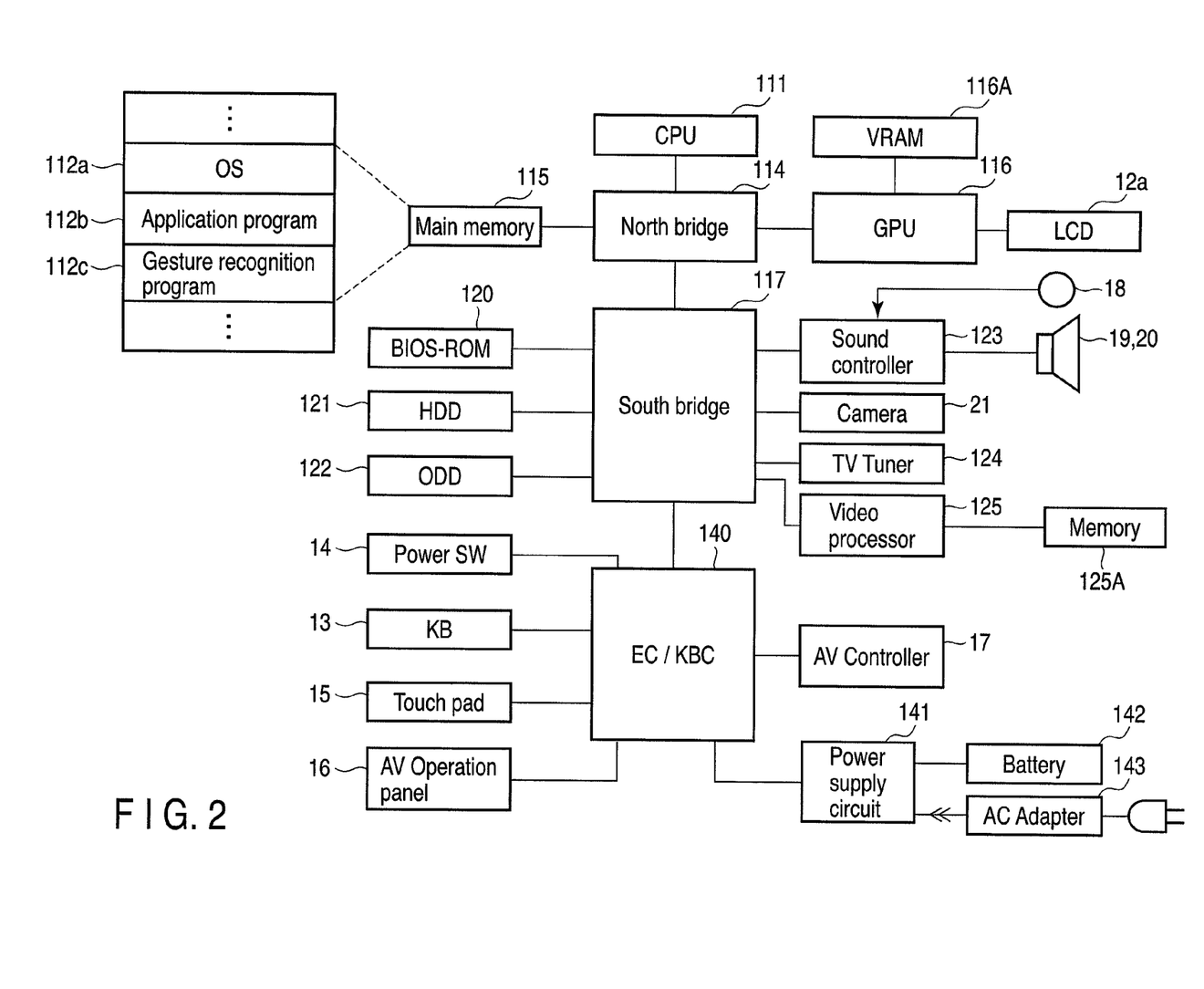
FIG. 2 is an exemplary block diagram showing the system configuration of the personal computer according to the embodiment.

To begin with, referring to FIG. 1 and FIG. 2, the structure of an image processing apparatus according to an embodiment of the invention is described. The image processing apparatus is realized, for example, as a notebook personal computer 10.

FIG. 1 is a perspective view that shows the state in which a display unit of the notebook personal computer 10 is opened. The computer 10 comprises a computer main body 11 and a display unit 12. A display device that is composed of an LCD (Liquid Crystal Display) 12a is built in the display unit 12. The display screen of the LCD 12a is positioned at an approximately central part of the display unit 12. A pair of speakers (tweeters) 20 are disposed on both sides of the LCD 12a.

The display unit 12 is attached to the computer main body 11 such that the display unit 12 is freely rotatable between an open position and a closed position. The computer main body 11 has a thin box-shaped casing. A keyboard 13, a power button 14 for powering on/off the computer 10, a touch pad 15, an audio/video (AV) operation panel 16, an AV controller 17, a volume control dial 18 and a pair of speakers 19 are disposed on the top surface of the casing of the computer main body 11. A camera 21, which can capture a color image, is provided on the display unit 12 at an upper side portion thereof in the open position of the display unit 12. The camera 21 can capture an image of the upper half of the user's body, including at least the face, who is using the personal computer 10. If the user raises the hand to a level of the upper body, the camera 21 can capture an image including the face and the hand.

Next, referring to FIG. 2, the system configuration of the computer 10 is described.

The computer 10 comprises a CPU 111, a north bridge 114, a main memory 115, a graphics processing unit (GPU) 116, a south bridge 117, a BIOS-ROM 120, a hard disk drive (HDD) 121, an optical disc drive (ODD) 122, a sound controller 123, a TV tuner 124, a video processor 125, an embedded controller/keyboard controller IC (EC/KBC) 140, and a power supply circuit 141.

The CPU 111 is a processor that is provided for controlling the operation of the computer 10. The CPU 111 executes an operating system (OS) 112a, various application programs 112b and a gesture recognition program 112c, which are loaded from the HDD 121 into the main memory 115. The various application programs 112b and gesture recognition program 112c are recorded in the computer 10 via computer-readable recording media or communication media. The gesture recognition program 112c is a program for inputting an instruction for controlling, for example, the operation of the application program 112b, on the basis of the gesture of the "hand", that is, the shape of the hand (clenched first; spreading of the palm of the hand; raising/pointing of the finger) or the movement of the hand (moving of the hand; moving of the finger). The gesture recognition program 112c detects an image corresponding to the "hand" (hereinafter referred to as "hand image"), as an object of recognition, from the color image which is input from the camera 21. On the basis of the movement of the object, the gesture recognition program 112c determines an input instruction, converts the input instruction to a command or data which relates to the application program 112b, and outputs the command or data. A real-time recognition process of gestures (object recognition) is executed by the video processor 125. In addition, the CPU 111 executes a BIOS (Basic Input/Output System) that is stored in the BIOS-ROM 120.

The north bridge 114 is a bridge device that connects a local bus of the CPU 111 and the south bridge 117. The north bridge 114 includes a memory controller that access-controls the main memory 115. The north bridge 114 also has a function of executing communication with the graphics processing unit (GPU) 116 via, e.g. a PCI Express bus.

The graphics processing unit (GPU) 116 is a display controller which controls the LCD 12a that is used as a display monitor of the computer 10. The GPU 116 generates a video signal, which forms a screen image that is to be displayed on the LCD 12a, on the basis of display data that is written in a video memory (VRAM) 116A by the OS or the application program.

The south bridge 117 includes an IDE (Integrated Drive Electronics) controller or a Serial ATA controller for controlling the hard disk drive (HDD) 121 and optical disc drive (ODD) 122.

The HDD 121 is a storage device which stores various programs and data. The HDD 121 stores, for instance, the OS, various application programs and the gesture recognition program.

The optical disc drive (ODD) 122 is a drive unit for driving storage media, such as a DVD, in which video content is stored.

The sound controller 123 is a sound source device and executes a process for outputting sound, which corresponds to various audio data, from the speakers 19 and 20. The TV tuner 124 receives broadcast program data which is broadcast by a TV broadcast signal.

Further, the video processor 125 is connected to the south bridge 117 via a PCI EXPRESS serial bus. The video processor 125 is a dedicated engine for executing a video streaming process or a video recognition process. For example, the video processor 125 is used in a process for recognizing, in real time, hand gestures, on the basis of a color image from the camera 21 that is mounted on the personal computer 10. For example, in the case where the application program 112b accepts an input operation from the user by the movement of the hand or finger (hand gesture), the application program 112b executes the process for recognizing the object corresponding to the "hand" from the image that is input from the camera 21, and determining the movement of the hand or finger (hand gesture).

A memory 125A is used as a working memory of the video processor 125. In the present embodiment, the video processor 125, which is a dedicated processor different from the CPU 111, is used as a back-end processor, and the hand gesture recognition process, for example, is executed by the video processor 125. Thus, the hand gesture recognition process is enabled without increasing the load on the CPU 101.

The embedded controller/keyboard controller IC (EC/KBC) 140 is a 1-chip microcomputer in which an embedded controller for power management and a keyboard controller for controlling the keyboard (KB) 13 and touch pad 15 are integrated. The EC/KBC 140 is always supplied with operation power from the power supply circuit 141 even in the state in which the computer 10 is powered off. The EC/KBC 140 functions as a controller for controlling the AV operation panel 16. Communication between the EC/KBC 140 and AV controller 20 is executed via, e.g. a serial bus.

The EC/KBC 140 has a function of powering on/off the computer 10 in response to the user's operation of the power button switch 14. The power on/off control of the computer 10 is executed by cooperation of the EC/KBC 140 and power supply circuit 141. The power supply circuit 141 uses power from a battery 142 which is mounted in the computer main body 11 or power from an AC adapter 143 which is connected to the computer main body 11 as an external power supply, thereby generating operation powers to the respective components.

Figure 3:
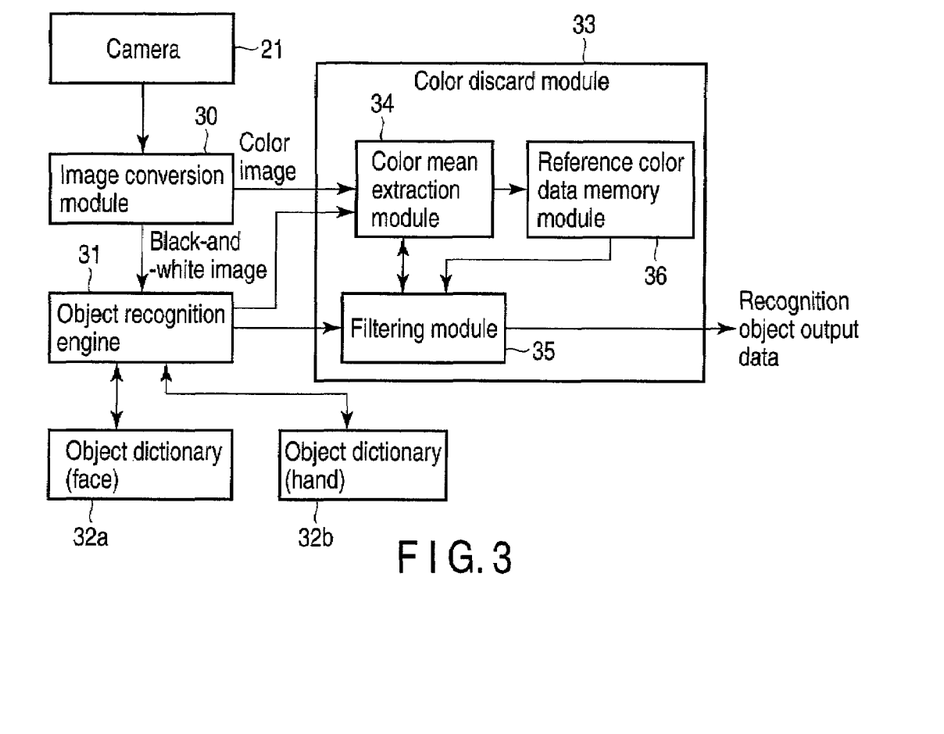
FIG. 3 is an exemplary block diagram showing the functional structure for object recognition, which is realized by a gesture recognition program (image processing program) in the embodiment.

FIG. 3 is a block diagram showing the functional structure for object recognition, which is realized by the gesture recognition program 112c (image processing program). The video processor 125 executes the gesture recognition program 112c, thereby enabling the personal computer 10 to realize the functions of an image conversion module 30, an object recognition engine 31, an object dictionary 32 (32a, 32b), and a color discard module 33 (color mean extraction module 34, filtering module 35 and reference color data memory module 36).

The image conversion module 30 outputs a color image, which is captured by the camera 21, to the color discard module 33 (color mean extraction module 34), and converts the color image to a black-and-white image and outputs the black-and-white image to the object recognition engine 31.

The object recognition engine 31 detects an object region from the black-and-white image that is converted by the image conversion module 30, on the basis of dictionary data for object recognition which is pre-registered in the object dictionary 32 (32a, 32b), and the object recognition engine 31 outputs object recognition data which is indicative of the object region. In the object dictionary 32, dictionary data for recognizing an object on the basis of the shape of the object is registered. The object recognition engine 31 detects, from the black-and-white image, an image region, which corresponds to the shape indicated by the dictionary data, as an object region.

In the object dictionary 32a, dictionary data for detecting an object region (first object region), which corresponds to, e.g. a face image of a person, is registered. The object region corresponding to the face image (hereinafter referred to as "face image object region") is detected in order to set reference color data which is referred to in order to narrow down candidates of an object region corresponding to a hand image (hereinafter referred to as "hand image object region") (second object region) that is the object of recognition. The object recognition module 31 outputs object recognition data, which is indicative of the face image object region, to the color mean extraction module 34.

In the object dictionary 32b, dictionary data for detecting, e.g. the hand image object region (second object region) is registered. In the object dictionary 32b, dictionary data, which corresponds to various hand shapes (clenched first; spreading of the palm of the hand; raising/pointing of the finger) for recognizing hand gestures, is registered. The object recognition engine 31 outputs candidates of the hand image object region, as object recognition data (object region candidate list), to the color discard module 33 (color mean extraction module 34, filtering module 35).

The color discard module 33 sets reference color data on the basis of color information which is extracted from the face image object region (first object region) that is detected by the object recognition engine 31, and discards a hand image object region (second object region) which is not regarded as having a similar color to the reference color data, thereby executing narrowing-down of candidates (filtering process).

The color discard module 33 comprises the color mean extraction module 34, filtering module 35, and reference color data memory module 36.

The color mean extraction module 34 extracts color information of each object region, on the basis of the color image data of the object region which is detected from the image by the object recognition engine 31. In the present embodiment, a color mean is calculated with respect to the object region, and the calculated color mean is used as the color information. Alternatively, other color information, which represents the feature of the object region, may be used in place of the color mean of the object region. The color mean extraction module 34 extracts color information of the image of the face image object region and sets reference color data, and outputs the reference color data to the filtering module 35 and stores the reference color data in the reference color data memory module 36 (reference color data setting process). In addition, the color mean extraction module 34 extracts color information of each candidate of the hand image object region, and outputs the color information to the filtering module 35.

With respect to each of the candidates of the hand image object region which are detected by the object recognition engine 31, the filtering module 35 compares the reference color data, which is set by the color mean extraction module 34, and the color information of the hand image object region, which is extracted by the color mean extraction module 34. Based on the comparison result, the filtering module 35 selects the candidate of the hand image object region, which is the object of recognition, from the object region candidate list. In addition, on the basis of the result of the comparison between the reference color data and color information, the filtering module 35 outputs any one of the candidates of the hand image object region as the object of recognition (recognition object output data).

The reference color data memory module 36 stores the reference color data that is set by the color mean extraction module 34 on the basis of the color information (color mean). In the present embodiment, the reference color data memory module 36 stores reference color data that is set on the basis of a plurality of latest images (e.g. 5 frames) which are captured by the camera 21. In the case where a face image object region is not detected by the object recognition engine 31, the filtering module 35 compares the color information of the hand image object region and the reference color data corresponding to an immediately preceding image, which is stored in the reference color data memory module 36, thus being able to select the candidate of the hand image object region.

Figure 4:
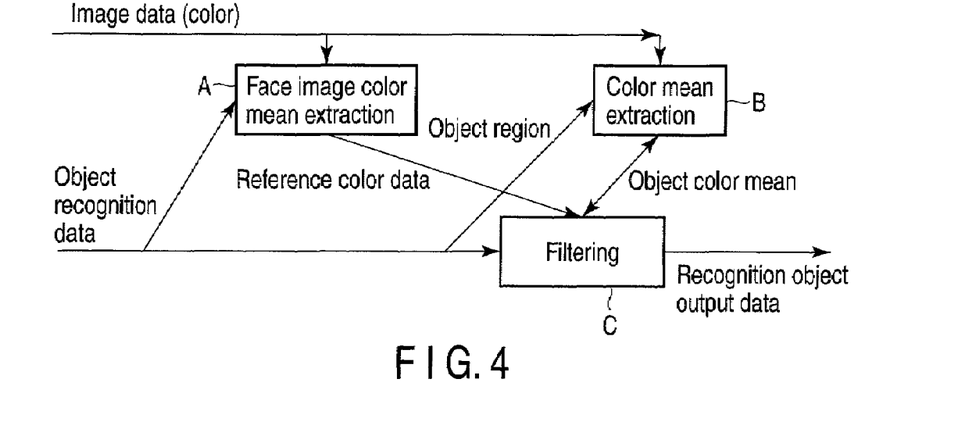
FIG. 4 shows an exemplary an object recognition process in the present embodiment.

FIG. 4 schematically shows the object recognition process in the present embodiment.

As shown in FIG. 4, in the personal computer 10 of the present embodiment, if the gesture recognition program 112c is started, a color image is captured by the camera 21. On the basis of this image, the object recognition process is executed to recognize the shape and movement of the user's hand.

In the object recognition process, the face image object region for setting the reference color data and the hand image object region that is the object of recognition are detected from the same one frame image that is captured by the camera 21. As regards the face image object region, the color mean is extracted and the reference color data is set (A in FIG. 4). On the other hand, as regards the hand image object region, in a case where a plurality of candidates are detected from the black-and-white image on the basis of the shape of the hand, a color mean is extracted with respect to each of the hand image object regions (B in FIG. 4). The color mean of each of the hand image object regions is compared with the reference color data, and hand image object regions each having color mean which is not similar to the reference color data are discarded from the candidates of the object of recognition (C in FIG. 4). At last, for example, the hand image object region having a closest color (highest similarity) to the reference color data is output as an object corresponding to the user's hand that is to be recognized (recognition object output data).

In the object recognition process, the above-described process is continuously executed with respect to each frame image that is captured by the camera 21. Thereby, even if a variation occurs in the photographing environment of images, the hand image object can be recognized by comparison with the reference color data that is set on the basis of the face image object region in the same image. Thereby, the hand image object region can precisely be recognized without influence due to variations.

Next, the operation of the object recognition process is described in detail with reference to flow charts.

Figure 5:
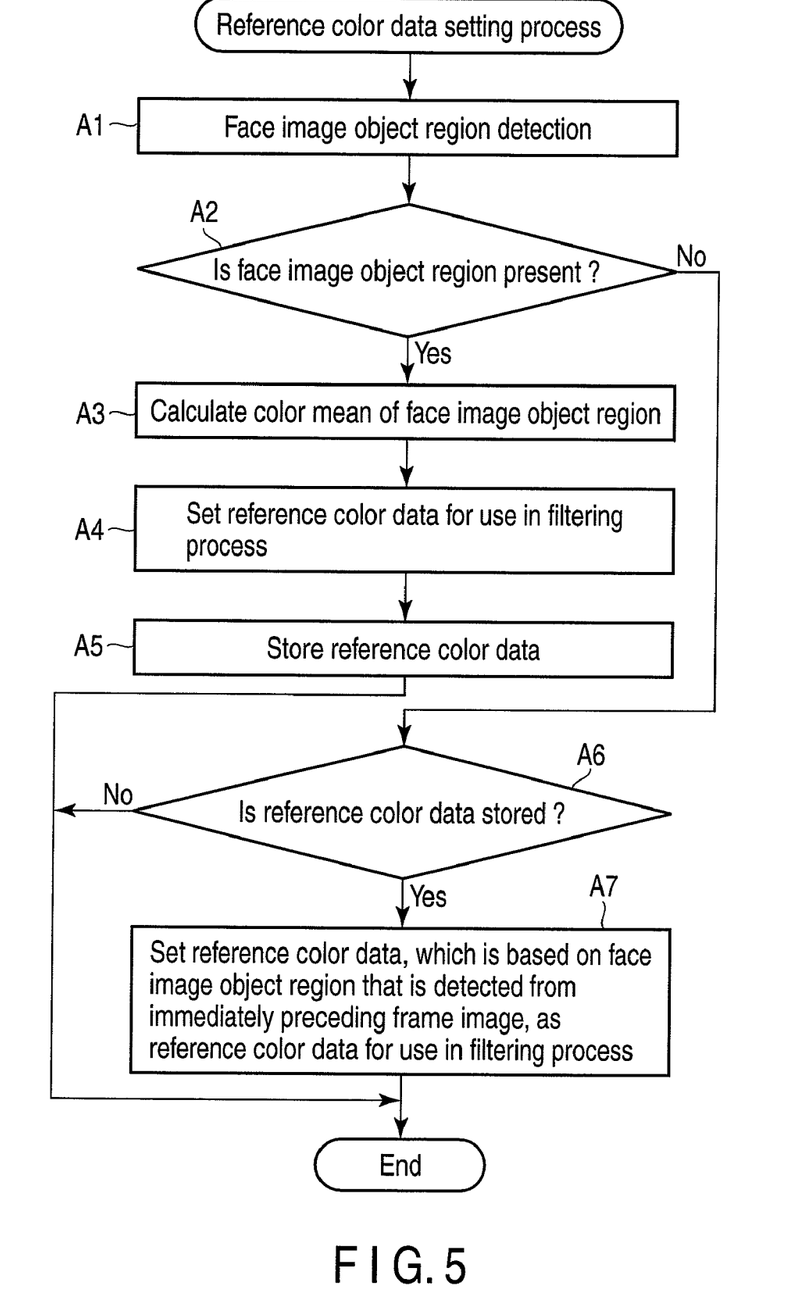
FIG. 5 is an exemplary flow chart for explaining a reference color data setting process for setting reference color data in the embodiment.

FIG. 5 is a flow chart for describing the reference color data setting process for setting the reference color data.

To start with, a color image, which is captured by the camera 21, is output to the image conversion module 30 and converted to a black-and-white image. With respect to the black-and-white image which is output from the image conversion module 30, the object recognition engine 31 detects a face image object region on the basis of the dictionary data which is registered in the object dictionary 32a (block A1). For example, the object recognition engine 31 detects, from the black-and-white image, a region corresponding to the shape of the face (e.g. a combination of the lines of the face, the eyes, the nose and the mouth), by matching with the dictionary data. Since the face image, compared to a hand image, includes characteristic elements, the face image can more surely be detected.

In the case where a face image object region is detected (Yes in block A2), the object recognition engine 31 outputs to the color mean extraction module 34 the object recognition data that is indicative of the detected face image object region.

On the basis of the color image data corresponding to the face image object region, the color mean extraction module 34 calculates a color mean in the face image object region (block A3). On the basis of the color mean in the face image object, the color mean extraction module 34 sets reference color data for use in the filtering process (block A4), and stores the reference color data in the reference color data memory module 36 (block A5). The reference color data memory module 36 stores reference color data of, e.g. the latest five frame images. The number of frame images can arbitrarily be determined.

In the case where no face image object region is detected from the black-and-white image by the object recognition engine 31 (No in block A2), if reference color data is stored in the reference color data memory module 36 (Yes in block A6), the color mean extraction module 34 sets, as reference color data for use in the filtering process, the reference color data that is based on the face image object region which is detected from the immediately preceding frame image (block A7).

In this manner, even if the face image object region is not detected, the reference color data, which is set on the basis of the preceding frame image, is stored, and the filtering process, which is described below, can continuously be executed by making use of the reference color data. In addition, even if a variation occurs in the photographing environment at the time of capturing an image by the camera 21, the influence of the variation can be minimized by using the reference color data that is set on the basis of the face image object region in the immediately preceding frame image.

Subsequently, the filtering process using the reference color data is executed.

Figure 6:
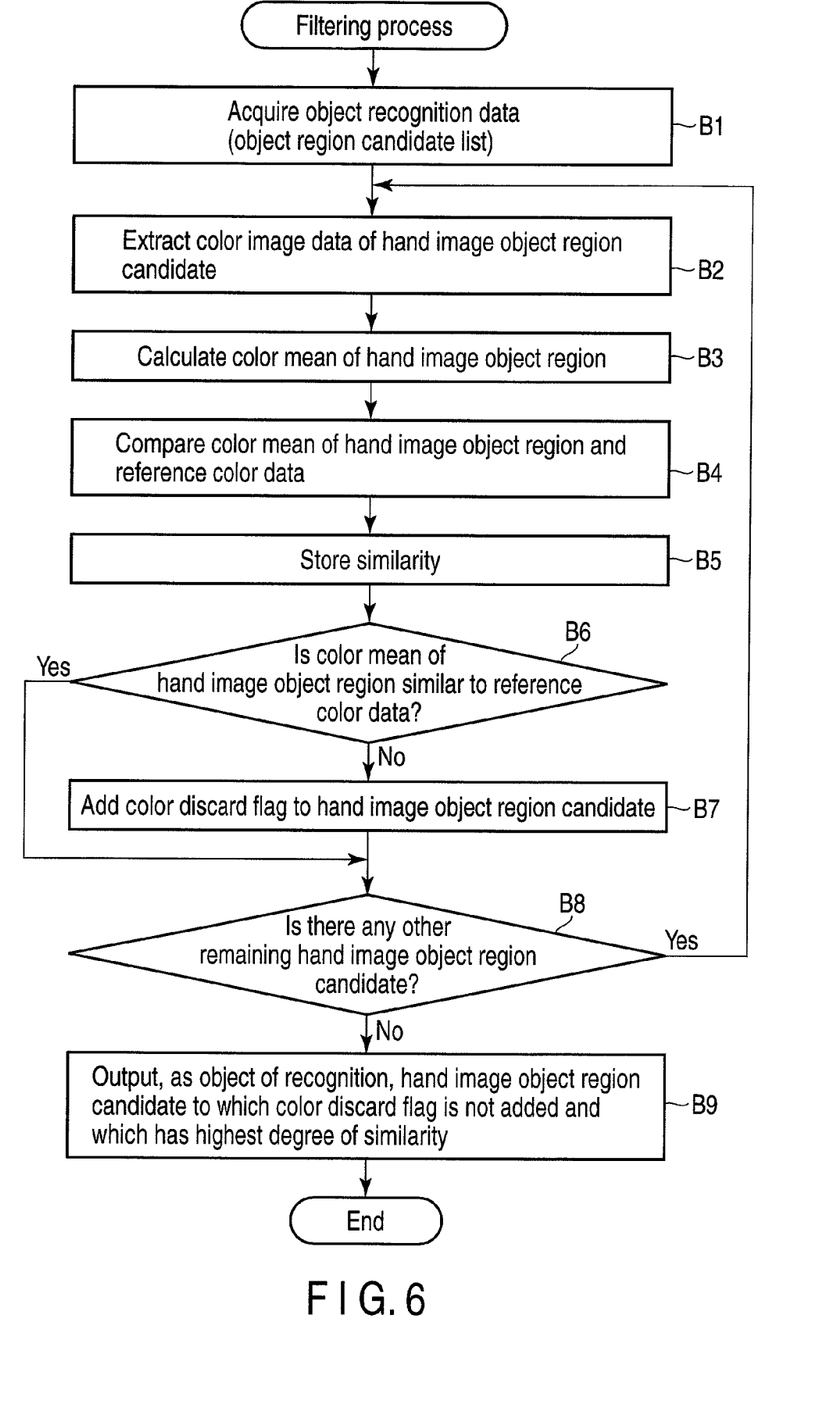
FIG. 6 is an exemplary flow chart for explaining a filtering process using the reference color data in the embodiment.

FIG. 6 is a flow chart for describing the filtering process using the reference color data.

With respect to the black-and-white image which is output from the image conversion module 30, the object recognition engine 31 detects a hand image object region on the basis of the dictionary data which is registered in the object dictionary 32b, for example, by matching with the dictionary data. In the object dictionary 32b, dictionary data, which corresponds to various hand shapes (clenched first; spreading of the palm of the hand; raising/pointing of the finger) for recognizing hand gestures, is registered. Thus, if the user forms the hand in a predetermined shape (gesture) in order to instruct some operation, the image of this hand can be detected as the hand image object region.

The shape of the hand, compared to the face image, is not characteristic, and is expressed by a combination of simple lines. Consequently, there is a case in which wrinkles of clothes, wrinkles of curtains or stacked books, for instance, may become similar to the shape of the hand, and an object, which does not relate to the hand, may be detected as a candidate of the hand image object region. In the case where a plurality of candidates of the hand image object region are detected from the image, the object recognition engine 31 outputs an object region candidate list as object recognition data.

Figure 7:
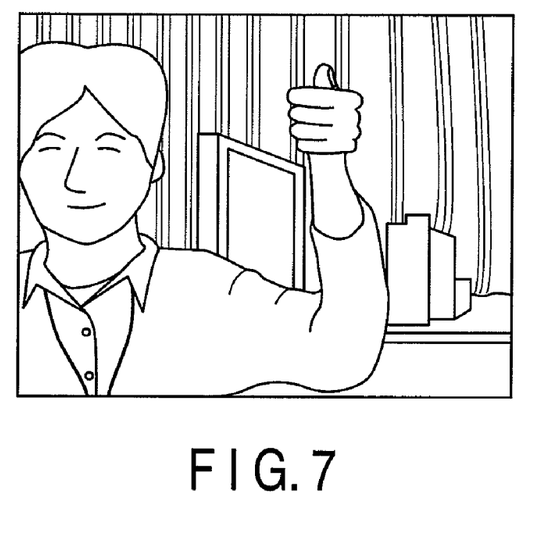
FIG. 7 is an exemplary an image which is captured by a camera in the embodiment.

FIG. 7 shows an example of an image which is captured by the camera 21. As shown in FIG. 7, the camera 21 captures an image including the user's face and hand. Since the image that is captured by the camera 21 includes not only the person but also the background, there is a case in which the image includes a shape similar to the hand which is expressed by a combination of simple lines.

Figure 8:
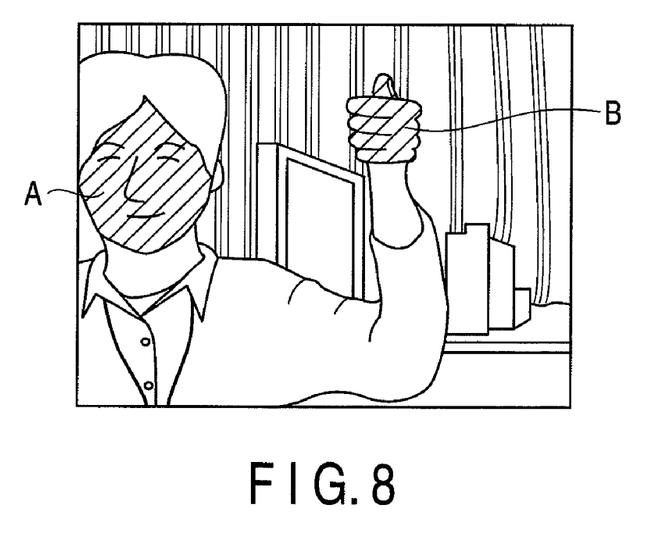
FIG. 8 is an exemplary a face image object region A and a hand image object region B, which are detected from the image shown in FIG. 7.

FIG. 8 shows a face image object region A which is detected from the image shown in FIG. 7. In the filtering process of the present embodiment, improper candidates are discarded from candidates of the hand image object region by comparison between the reference color data, which is set on the basis of the color information of the face image object region A, and the color information of the hand image object region, and finally a hand image object region B is recognized.

In the above description, the candidates of the hand image object region are detected, for example, by matching with the dictionary data, on the basis of the black-and-white image which is converted by the image conversion module 30. Alternatively, candidates may be narrowed down by making use of preset color information. For example, the flesh color information of a person is preset, and only hand image object regions having color information corresponding to the flesh color information are set as candidates. Thereby, object images corresponding to, e.g. clothes and curtains, which do not have the flesh color, can be excluded in advance. However, as regards the preset flesh color information, the range of the color information, which is considered to be the flesh color, is set to be so wide that hand image object regions can surely be left as candidates even if there occurs a variation in the photographing environment or there are individual differences.

To start with, the color discard module 33 acquires an object region candidate list from the object recognition engine 31 (block B1). The color mean extraction module 34 extracts color image data, which corresponds to one hand image object region in the list, and calculates a color mean (block B2, B3).

The filtering module 35 compares the color mean of the hand image object region, which is extracted by the color mean extraction module 34, and the reference color data which is set by the reference color data setting process, and calculates the degree of similarity (block B4). The filtering module 35 stores the similarity with the reference color data in association with the hand image object region that is the object of processing (block B5).

In the case where it can be determined that the color mean of the hand image object region is similar to the color of the reference color data, that is, in the case where the degree of similarity is higher than a preset threshold (Yes in block B6), the hand image object region that is the object of processing is left as the candidate.

On the other hand, in the case where it can be determined that the color mean of the hand image object region is not similar to the color of the reference color data, that is, in the case where the degree of similarity is not higher than the preset threshold (No in block B6), the filtering module 35 adds a color discard flag to the candidate of the hand image object region that is the object of processing, and excludes this candidate from the object of recognition (block B7).

Subsequently, in the similar manner, the comparison with the reference color data is executed with respect to all candidates of the hand image object region, which are set as the object region candidates (blocks B2 to B8). When the comparison between the color mean and the reference color data is completed with respect to all hand image object regions, the filtering module 35 outputs, as the hand image object region that is the object of recognition (i.e. recognition object output data), the candidate of the hand image object region to which the color discard flag is not added and which has the color mean with the highest degree of similarity with the reference color data (block B9).

As has been described above, in the personal computer 10 (image processing apparatus) of the present embodiment, the color information (color mean) of the face image object region, which is detected from the image captured by the camera 21, is extracted, and this color information, which is used as the reference color data, is compared with the color information of the image of the candidate of the hand image object region, which is extracted from the same image. Thereby, the object of recognition is output. Therefore, even if there are unstable factors, such as an individual difference between objects of recognition or a variation of the photographing environment, the object in the image can precisely be recognized.

The process that has been described in connection with the above-described embodiment may be stored as a computer-executable program in a recording medium such as a magnetic disk (e.g. a flexible disk, a hard disk), an optical disk (e.g. a CD-ROM, a DVD) or a semiconductor memory, and may be provided to various apparatuses. The program may be transmitted via communication media and provided to various apparatuses. The computer reads the program that is stored in the recording medium or receives the program via the communication media. The operation of the apparatus is controlled by the program, thereby executing the above-described process.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
    an image-capturing module configured to capture an image;
    a first object region detection module configured to detect a first object region from the image captured by the image-capturing module, based on a shape of a first object;
    a first color information extraction module configured to extract first color information of an image of the first object region, and to set the first color information as reference color data
    a second object region detection module configured to detect candidates of a second object region of an object of recognition from the image captured by the image-capturing module, based on a shape of a second object which differs from a first object;
    a second color information extraction module configured to extract second color information of an image of the second object region;
    a filtering module configured to compare the reference color data set by the first color information extraction module and the second color information extracted by the second color information extraction module, with respect to each of the candidates of the second object region detected by the second object region detection module, and to reject the candidates of the second object region each having color information which is not considered to be similar to color information of the reference color data, based on a comparison result; and
    an output module configured to output any one of the candidates of the second object region not rejected by the filtering module, which has color information closest to a color represented by the color reference data, as an object of recognition.

2. The image processing apparatus of claim 1, wherein the first color information extraction module is configured to calculate a set of averages of color values in the first object region as the first color information, and
    the second color information extraction module is configured to calculate a set of averages of color values in the second object region as the second color information.

3. The image processing apparatus of claim 1, further comprising a reference color data memory module configured to store the reference color data set by the first color information extraction module, with respect to a plurality of images captured by the image-capturing module,
 wherein the filtering module is configured to compare the second color information extracted by the second color information extraction module and the reference color data stored in the reference color data memory module and corresponding to an immediately preceding image, when the first object region is not detected from the image captured by the image-capturing module.

4. The image processing apparatus of claim 1, wherein the first object region detection module is configured to detect a region corresponding to a face image of a person as the first object region from the image, and
 the second object region detection module is configured to detect a region corresponding to a hand image of the person as the second object region from the image.

5. An image processing method comprising:
 capturing an image;
 detecting a first object region from the captured image, based on a shape of a first object;
 extracting first color information of an image of the first object region, and setting the first color information as reference color data;
 detecting candidates of a second object region of an object of recognition from the captured image, based on a shape of a second object which differs from a first object;
 extracting second color information of an image of the second object region;
 performing filtering by comparing the reference color data set by the first color information extraction, and the second color information extracted by the second color information extraction, with respect to each of the candidates of the second object region and rejecting the candidates of the second object region each having color information which is not considered to be similar to color information of the reference color data based on a comparison result; and
 outputting any one of the candidates of the second object region not rejected by the filtering, which has color information that is closest to a color represented by the color reference data, as an object of recognition.

6. The image processing method of claim 5, wherein the extracting the first color information comprises calculating a set of average of color values in the first object region as the first color information, and
 the extracting the second color information comprises calculating a set of averages of color values in the second object region as the second color information.

7. The image processing method of claim 5, further comprising storing reference color data set by the first color information extraction, with respect to a plurality of images captured by the image capturing,
 wherein the filtering comprises comparing the second color information extracted by the second color information extraction and the reference color data stored and corresponding to an immediately preceding image when the first object region is not detected from the captured image.

8. The image processing method of claim 5, wherein the detecting the first object region comprises detecting a region corresponding to a face image of a person as the first object region from the image, and
 the detecting the second object region comprises detecting a region corresponding to a hand image of the person as the second object region from the image.

9. A computer-readable medium comprising a computer program executable by a computer, the computer program controlling the computer to execute functions of:
 capturing an image;
 detecting a first object region from the captured image, based on a shape of a first object;
 extracting first color information of an image of the first object region and setting the first color information as reference color data;
 detecting candidates of a second object region of an object of recognition from the captured image, based on a shape of a second object which differs from a first object;
 extracting second color information of an image of the second object region;
 performing filtering by comparing the reference color data set by the first color information extraction, and the second color information extracted by the second color information extraction with respect to each of the candidates of the second object region and rejecting the candidates of the second object region each having color information which is not considered to be similar to color information of the reference color data based on a comparison result; and
 outputting any one of the candidates of the second object region not rejected by the filtering, which has color information that is closest to a color represented by the color reference data, as an object of recognition.

10. The computer-readable medium of claim 9, wherein the extracting the first color information comprises calculating a set of average of color values in the first object region as the first color information, and
 the extracting the second color information comprises calculating a set of averages of color values in the second object region as the second color information.

11. The computer-readable medium of claim 9, further comprising storing reference color data set by the first color information extraction, with respect to a plurality of images captured by the image capturing,
 wherein the filtering comprises comparing the second color information extracted by the second color information extraction and the reference color data stored and corresponding to an immediately preceding image when the first object region is not detected from the captured image.

12. The computer-readable medium of claim 9, wherein the detecting the first object region comprises detecting a region corresponding to a face image of a person as the first object region from the image, and
 the detecting the second object region comprises detecting a region corresponding to a hand image of the person as the second object region from the image.

* * * * *